Figure 1:
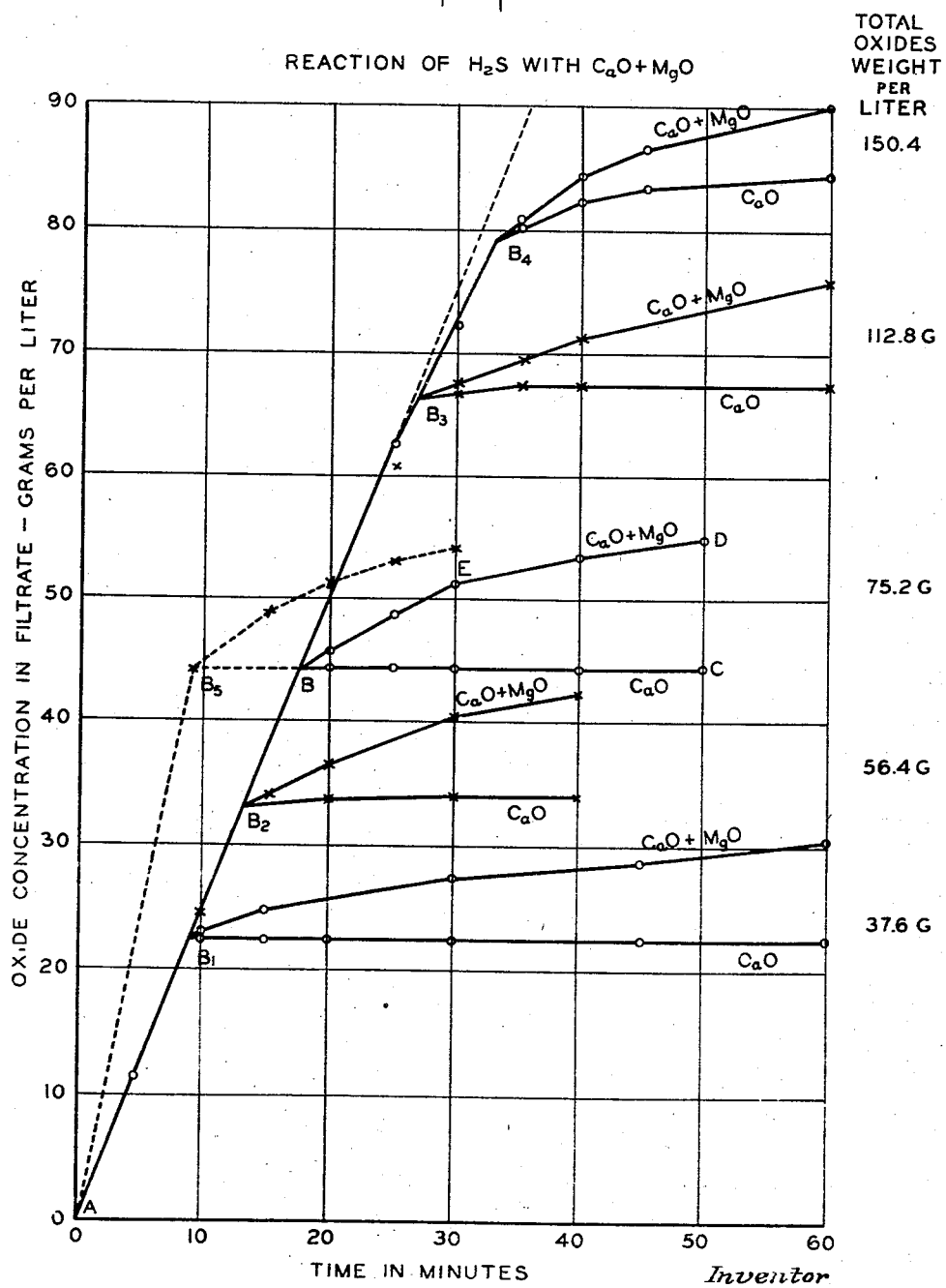

April 27, 1943.    J. A. MURRAY    2,317,396
PROCESS FOR SEPARATING CALCIUM VALUES FROM MAGNESIUM VALUES
Filed Jan. 26, 1940    3 Sheets-Sheet 3

Inventor
JAMES A. MURRAY
by his attorneys

Patented Apr. 27, 1943

2,317,396

UNITED STATES PATENT OFFICE 2,317,396

PROCESS FOR SEPARATING CALCIUM VALUES FROM MAGNESIUM VALUES

James A. Murray, Paoli, Pa., assignor to Warner Company, Devault, Pa., a corporation of Delaware Application January 26, 1940, Serial No. 315,851

4 Claims. (Cl. 23—66)

This invention relates to a process for separating relatively pure calcium values and other desired values from natural or industrial products containing the same, and more particularly to a novel method for producing pure calcium values and calcium-free magnesium values separately from impurity-contaminated calcium oxide and/or hydroxide-containing substances.

More specifically, it relates to a novel method for solubilizing and obtaining relatively pure calcium compounds from impure substances, such as milk of lime, whereby pure, finely-divided calcium carbonate may be produced from the calcium compounds so recovered.

Calcium carbonate comprises a well-known article of commerce. Its use in industrial applications, particularly those which require the carbonate to be in a pure, finely-divided condition, has been restricted somewhat due to the fact that great difficulty is encountered when attempts are made to obtain pure, finely-divided forms of such product. This arises principally from the fact that many impurities, such as silica, iron and aluminum oxides, heavy metals and magnesia, etc., are present in the calcium-containing material, especially calcium oxide or hydroxide, from which said calcium carbonate is usually produced.

Four general methods for obtaining calcium carbonate in a finely-divided form from calcium-containing substances are known, i. e., (1) crushing chalk; (2) pulverizing limestone; (3) passing carbon dioxide gas into a suspension of calcium hydroxide; and (4) precipitating the carbonate from a solution of a soluble calcium salt through the medium of a soluble carbonate. However, these methods are non-adapted for use in the production of calcium carbonate in satisfactorily pure and finely-divided state. Further, none permits one to obtain a satisfactory CaCO₃ product directly from substances containing calcium values which are in admixture with values other than calcium, without resort to a previous, costly purifying or separating operation. Thus, the first two fail to remove any of the impurities present in the chalk or limestone; the third, while possibly affording partial removal of relatively coarser impurities by hydraulic classification of the finely-dispersed hydroxide or carbonate, fails to effect necessary and complete removal thereof.

Since magnesia is a constituent of practically all limestones, even of the so-called high calcium limestones which contain from traces up to 1% or more, and is present in such form that upon burning and slaking the lime, the magnesia is reduced to a fineness of the same order of magnitude as the calcium hydroxide formed by those operations, it is apparent that even the third method will not eliminate magnesia from the calcium carbonate, while of course neither of the first two methods will do so.

The fourth general method entails a rather difficult, uneconomical operation, because waste or residual chemicals associated with the calcium and the carbonate must be discarded; or, if recovered, a costly water-evaporating operation must be resorted to for the purpose of recovering said chemicals. For instances, in a method of the latter type, when production of the carbonate is effected in solution through the reaction

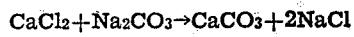

$$CaCl_2 + Na_2CO_3 \rightarrow CaCO_3 + 2NaCl$$

it is essential that all of the water originally associated with the calcium chloride and all of the water originally associated with the sodium carbonate, plus all of the water required to free the calcium carbonate from adhering to the sodium chloride, be evaporated before recovery of the sodium chloride can be had.

It is among the objects of my invention to overcome these and other difficulties in prior processes for producing calcium carbonate, as well as to provide an improved, economical and relatively simple method for preferentially separating and obtaining a finely-divided, and exceedingly pure form of said carbonate substantially free from magnesium compounds, which product will be adapted for use in many widely-varying, commercial applications.

Since by the process, the calcium content may be separated from the silica, iron and aluminum oxides, heavy metals and magnesia, it is feasible, by starting with a material containing relatively large amounts of magnesia, for example, dolomitic lime or high calcium magnesites, to produce as a secondary product a valuable by-product suitable for use in the manufacture of refractory magnesia.

Another object of the invention is therefore to provide a simple and economical process for the treatment of materials containing calcium oxide or hydroxide and magnesia so that the calcium compound may be separated substantially completely from the magnesia; recovering the calcium values in the form of a pure calcium carbonate, free from silica, iron and aluminum oxides and heavy metals, and substantially free from magnesia; and recovering the magnesia values associated with the natural impurities but substantially free from calcium in a form suitable for industrial processing.

A further object is the recovery of the magnesium values as a substantially pure magnesia or magnesium hydroxide.

Other objects and features of novelty will be apparent from the following description:

A wide range of natural or industrial products are susceptible to treatment by this process. The natural products which are particularly suitable are the limestones. These may be either high calcium limestone in which the magnesia content is 5% or less, magnesian limestone in which the molar ratio of MgO to CaO is less than 1, or dolomite in which the molar ratio of MgO to CaO is approximately 1. Another natural product which may be beneficiated by treatment by this process is calcareous magnesite in which the molar ratio of MgO to CaO is greater than 1. In the latter case, the main product in volume may be the magnesia while the calcium carbonate becomes the secondary product. As an example of an industrial product, susceptible to treatment by this process, the lime waste obtained in the production of acetylene from calcium carbide may be cited.

Whatever the original material selected for treatment by this process, the recoverable calcium values contained therein, must be present as or converted into the form of calcium hydroxide. If not present as calcium hydroxide, they may be converted into calcium hydroxide in general by known processes. For example, if the original material is a limestone, it may be burned according to normal industrial practice to form quicklime which in turn may be treated with water to form calcium hydroxide.

The material containing the calcium values in the form of calcium hydroxide is suspended in water to form what will be referred to as lime milk. By the term "lime milk" or "milk of lime" as used in the subsequent specification and claims, I mean a saturated solution of calcium hydroxide carrying in suspension undissolved calcium hydroxide and insoluble impurities naturally associated therewith, such as silica, iron and aluminum oxides and magnesia.

The lime milk, according to the present invention, is treated with hydrogen sulfide to convert the slightly soluble calcium hydroxide into the very soluble calcium hydrosulfide in accordance with the reaction $$Ca(OH)_2 + 2H_2S \rightarrow Ca(SH)_2 + 2H_2O$$

However, the use of this reaction in a lime milk containing magnesium values involves a problem, because it is known that magnesium hydroxide will react in the presence of hydrogen sulphide to form soluble magnesium hydrosulphide in accordance with the reaction $$Mg(OH)_2 + 2H_2S \rightarrow Mg(SH)_2 + 2H_2O$$

For this reason it is an important feature of the present invention that the treatment with hydrogen sulfide is conducted under conditions which inhibit the formation of magnesium hydrosulfide. The magnesia present will therefore remain substantially undissolved and, together with the impurities which are insoluble in an alkaline sulfide solution, may be separated from the dissolved calcium hydrosulfide, for example, by filtration.

The filtered aqueous hydrosulfide solution is then treated with a gas consisting of or containing carbon dioxide to precipitate calcium carbonate and liberate hydrogen sulfide in accordance with the reaction $$Ca(SH)_2 + CO_2 + H_2O \rightarrow CaCO_3 + 2H_2S$$

The hydrogen sulfide so liberated is preferably returned to the hydrosulfidation step for the conversion of additional amounts of calcium hydroxide into calcium hydrosulfide.

Figure 1 is a group of curves showing the change in the concentrations of dissolved calcium and magnesium (in the form of hydrosulfide) with time when suspensions of calcium and magnesium hydroxides are treated with hydrogen sulfide. It should be noted that while the calcium in solution is actually present as calcium hydrosulfide ($Ca(SH)_2$), the concentration of the solution is expressed in terms of calcium oxide (CaO). This method of expression has been found useful in following the process from the original calcium oxide, through the hydroxide, hydrosulfide and finally to the carbonate form and will be adhered to in this specification. From the data in Figure 1, the relative rates of reaction of hydrogen sulfide with calcium hydroxide and with magnesia may be calculated.

Figure 2:
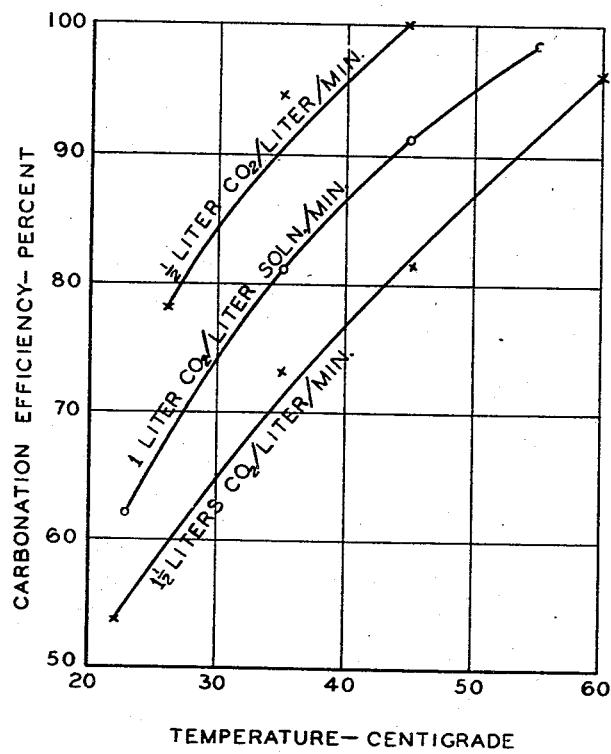
Figure 3:
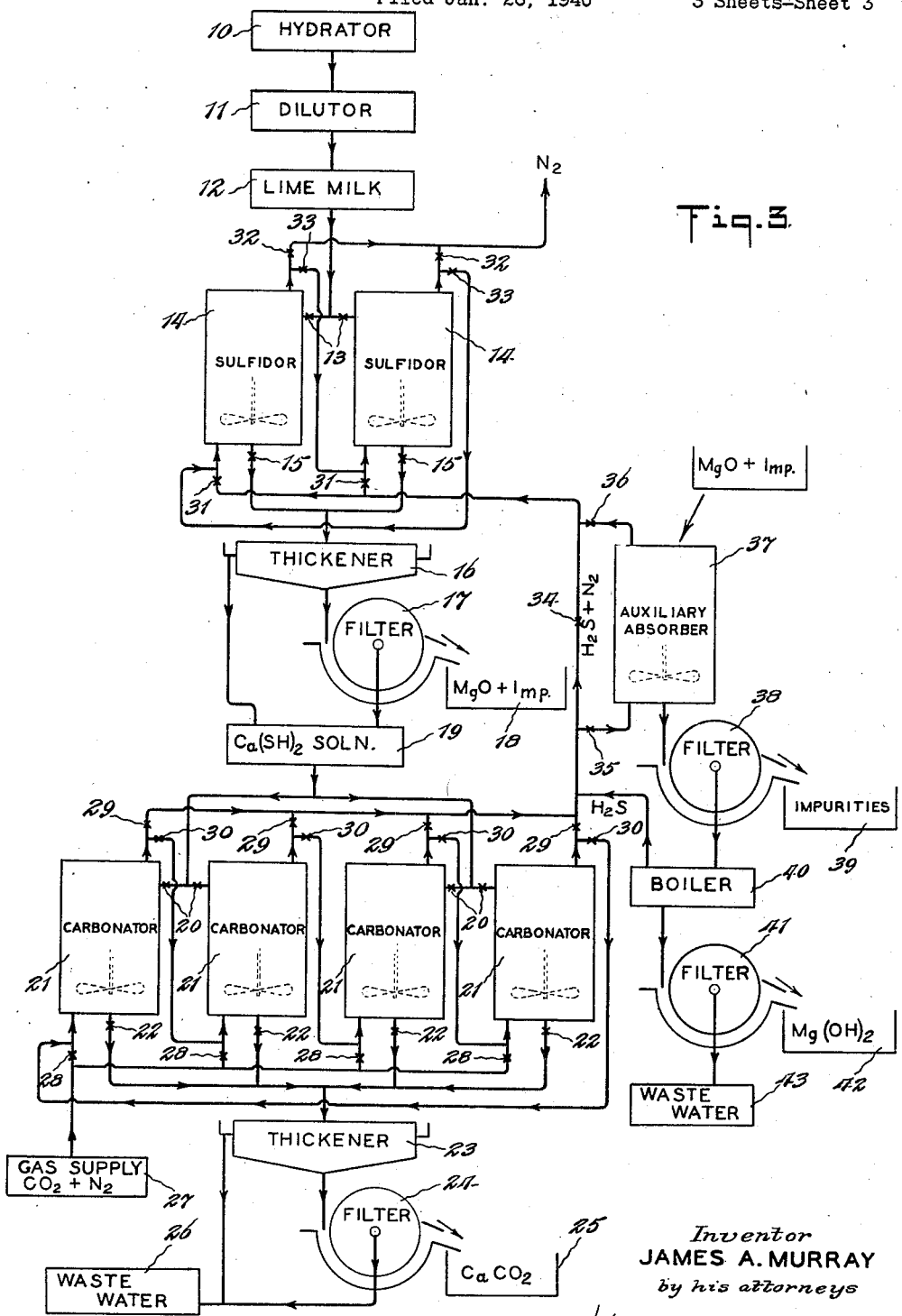

Figure 2 is a group of curves showing the effect of temperature upon the efficiency of the absorption of carbon dioxide by calcium hydrosulfide solution; and Figure 3 is a diagram of a form of apparatus for practicing the process according to the preferred embodiment of the present invention.

The common method of preparing a milk of lime from a high calcium quicklime is to treat the quicklime with an excess of water, for example with 250 to 400 parts of water to 100 parts of quicklime. This will produce a hot, practically boiling mass, which on standing and cooling slightly forms a so-called lime putty. This differs from a lime milk in that it is semi-solid in nature, may be piled up slightly, may be shoveled and will hold its shape. It is a plastic rather than a fluid material. After the lime has remained in the putty condition for a time sufficiently long to transform all of the calcium oxide into calcium hydroxide it may then be diluted with more water until it is truly fluid and forms the lime milk.

It is understood, of course, that in the preparation of the lime milk, any large particles of solid impurities may be removed prior to the sulfiding step, by known methods such as screening or settling.

The concentration of the lime milk is preferably not more than 150 grams per liter of the total oxides of calcium and magnesium, otherwise some magnesia may dissolve before all of the calcium is dissolved, thus rendering a sharp separation difficult. The concentration is also preferably not less than 25 grams of total oxides per liter of lime milk, to avoid the handling of large quantities of liquid.

Higher concentrations than 150 grams of total oxides per liter may be employed, if sufficient time is allowed for the system to come to an equilibrium, in which case any magnesia that may have dissolved will exchange its anion with free lime, thereby producing a solution free from magnesia. Agitation also furthers the attainment of equilibrium. The manipulation is dependent upon the nature and purity of the products desired.

The lime milk, prepared as described above, is placed in a gas absorber or sulfidor. A suitable absorber for this purpose is one containing a turbine type gas disperser submerged in the liquor and affording efficient dispersion of the gas in the liquor. It is obvious however that other types of gas absorbers may be used without affecting the operation of the process. A gas consisting of or containing hydrogen sulfide is then passed through the absorber until substantially all of the calcium hydroxide has been converted into calcium hydrosulfide and the gas flow is stopped as soon as substantially all of the calcium has been dissolved and before any appreciable amount of magnesia has been converted to the soluble magnesium hydrosulfide.

Hence it will be seen that one of the features of the invention is the treatment of lime milk with hydrogen sulfide sufficient in amount to preferentially convert the calcium values present into a soluble sulfide.

It is known as hereinbefore stated that magnesium hydroxide will react in the presence of hydrogen sulfide to form soluble magnesium hydrosulfide

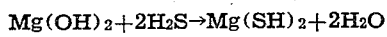

Furthermore, the curves of Figure 1 show that this reaction occurs with solution of the magnesia even in the presence of a solution containing large amounts of calcium hydrosulfide. The curves of Figure 1 also show that it is possible to carry out the hydrosulfidation so that substantially no magnesia is dissolved until all of the calcium hydroxide has been dissolved.

It is important for the production of a pure calcium carbonate by this process that little or no magnesium oxide or hydroxide be dissolved during this sulfiding operation as any magnesia so dissolved will carry through and ultimately may be precipitated in part or entirely with the calcium carbonate. It is also important for the commercial operation of this process that little or no calcium hydroxide be left undissolved with the impurities, since any calcium hydroxide which is undissolved represents a loss in the efficiency of the process. It is of even greater importance, if the magnesia residue is to be of commercial value, to keep the calcium content of the magnesia as low as possible; hence undissolved calcium hydroxide in addition to contributing to a loss in potential efficiency of the process is an undesirable contaminant of a potentially valuable by-product. It is obvious that the general efficiency of this process will be determined, in part at least, by the accuracy with which the end point at which all of the calcium hydroxide has been dissolved and none of the magnesium hydroxide has been dissolved may be determined.

The method by which I control this end point may be exemplified by reference to Figure 1. In this figure the data pertaining to the rate of absorption of hydrogen sulfide in several concentrations of lime milk are plotted. The solid curves on the right pertain to tests in which samples of lime milk were treated with hydrogen sulfide gas at the rate of 2 volumes or $H_2S$ gas per volume of milk per minute. The broken curves on the left pertain to a similar test in which the rate of gas supply was 4 volumes of $H_2S$ gas per volume of milk per minute. At various time intervals, samples of the liquor with its suspended solids were taken, filtered, and the filtrates analyzed to determine the calcium and magnesium contents (expressed as grams oxides per liter on the left hand scale).

Considering the curve for the two volumes of $H_2S$ gas per volume of lime milk per minute test, and particularly that portion of the curve pertaining to the 75.2 g. total oxide concentration, the portion AB is a straight line, directly proportional to the time. Analyses of samples taken at times prior to that represented by point B show that the solution contains only calcium oxide and no magnesium oxide. Samples taken at times subsequent to point B contain both calcium oxide and magnesium oxide in solution and no calcium hydroxide in the suspended solids. This is represented by the line BD which gives the total oxides in solution and the line BC which gives the calcium oxide in solution. The vertical distance at any time between lines BC and BD therefore represents the amount of magnesium oxide in solution. It is obvious from this set of curves that point B is the critical point in the separation since if the gas flow is stopped before point B is reached some undissolved calcium will remain with the magnesia, while if the gas flow is continued beyond point B some magnesia will be dissolved and will contaminate the calcium carbonate to be produced in the later steps of the process.

I have found that point B may be determined accurately and rapidly if the amount of hydrogen sulfide introduced into the absorber exceeds a certain minimum determined by the rate of reaction with magnesia. For example, again referring to Figure 1, in the section AB the hydrogen sulfide was being absorbed as rapidly as it was introduced, namely at the rate of 2 liters of hydrogen sulfide gas per liter of solution per minute. In the section BE however, the hydrogen sulfide was being absorbed by the magnesia but at a much slower rate, approximately 0.5 liter of hydrogen sulfide gas at atmospheric pressure and temperature per liter of solution per minute. Consequently, as soon as point B is reached, there is a sudden appearance of hydrogen sulfide in the waste gas leaving the absorber if the original gas was introduced into the absorber at a rate exceeding 0.5 liter of hydrogen sulfide per liter of solution per minute.

The broken curves in Figure 1 indicate an entirely similar condition when the rate of introduction of hydrogen sulfide into the absorber is doubled. It will be noted that the slope of the first section of this curve is exactly double that of the line AB, indicating that the rate of absorption in this portion is still controlled by the hydrogen sulfide rate, while the slope of the upper line beyond the break point is substantially equal to that of BE, indicating that the rate of reaction subsequent to the break point is controlled by the magnesia.

It will be apparent that the exact location of the critical point B is a function of both the calcium concentration of the lime milk and the rate of introduction of hydrogen sulfide. This is also shown in Figure 1. From these curves it is obvious that the vertical position of end point B is determined by the calcium content of the original lime milk, whereas the horizontal position is determined by the rate of supply of hydrogen sulfide gas. This is shown by the points $B_1$ to $B_5$, inclusive, on Figure 1.

To make use of this control method, I insert in the effluent gas line from the absorber a device to indicate the presence of hydrogen sulfide. This is preferably a gas analyzer, for example of the thermal conductivity type, and may be used as an indicator to inform the operator of the correct time at which to close the gas valves and disconnect the absorber, or it may be used as a controller to operate motor actuated valves and automatically shut off the supply of hydrogen sulfide to the absorber when the end point is reached.

The hydrogen sulfide may be supplied to the sulfidor in undiluted form, but it is preferred to supply it as a mixture with an inert gas, such as nitrogen. The concentration of the hydrogen sulfide in the gas passed through the suspension may vary from a small percentage, for example 5% or less, up to 100% hydrogen sulfide.

It is believed that the reaction of hydrogen sulfide on a suspension of calcium hydroxide and/or magnesia occurs primarily with the dissolved portion of hydroxide and only secondarily, if at all, as a surface reaction on the suspended particles. For this reason the controlling factor is probably the rate of solution of the calcium hydroxide or magnesium hydroxide respectively. A saturated solution of calcium hydroxide has a pH of about 12.5 whereas a solution of calcium hydrosulfide over a range of concentrations up to 100 grs. CaO/liter has a pH of about 10.5. Consequently, as hydrogen sulfide is added to a calcium hydroxide solution, it will tend to reduce the pH. Any tendency in this direction will be immediately counteracted by the solution of more calcium hydroxide, which solution occurs at a rate faster than the equivalent amount of hydrogen sulfide may be introduced into the absorber. Since it is a well-known principle that rate of solution is determined to a considerable extent by the degree of agitation therein, it appears that the maximum rate of solution of calcium hydroxide and consequently the maximum rate of introduction of hydrogen sulfide is a function of the particular apparatus used and the degree of agitation. Practically, it has been found that in the presence of well agitated calcium hydroxide, hydrogen sulfide is absorbed rapidly and completely, even when the rate of gas flow is four times the rated capacity of present standard commercial gas absorbers.

On the other hand, a saturated solution of magnesium hydroxide has a pH of about 10.5. Consequently, when a lime milk has been sulfided to complete solution of the calcium, its pH, being about 10.5 is the same as that of a magnesium hydroxide solution. There is therefore little tendency for the addition of more $H_2S$ to depress the pH and thereby increase the rate of solution of the magnesium hydroxide. The degree of agitation becomes relatively less important and the absolute rate of solution and consequently the rate of reaction of magnesia with hydrogen sulfide may be determined. This rate of reaction has been determined experimentally as being about ½ volume of hydrogen sulfide per volume of liquor per minute.

The product of this sulfidation step is an aqueous solution of calcium hydrosulfide in which magnesia and other impurities are suspended, giving it a dark slate color. The solid matter is separated from the liquid, preferably by filtration. The residual sludge or filter cake consists of magnesium oxide and/or hydroxide together with all impurities which are insoluble in an alkaline sulfide solution. This residue may be washed with water to remove the adherent calcium hydrosulfide liquor and the wash water may be united with original filtrate to conserve the calcium hydrosulfide.

With the filtration, the separation is accomplished, and the further treatment of the separated magnesia will depend upon the ultimate product desired. The residue or filter cake may be dried and burned to form dead-burned magnesia if its composition is suitable or suitable ingredients may be mixed therewith before further processing. Alternately, it may be used for the production of a pure magnesium hydroxide by a modification of this process to be described later.

The filtrate liquor, the aqueous calcium hydrosulfide solution, is placed in another gas absorber which may be similar to that employed for sulfidation, and a gas consisting of or containing carbon dioxide is passed therethrough. The carbon dioxide is absorbed in the solution and precipitates the calcium as pure calcium carbonate, simultaneously liberating hydrogen sulfide which is returned to the sulfidor for reuse.

The carbonation step is chemically operative at substantially all concentrations of the aqueous calcium hydrosulfide solution. The more concentrated solutions will react with carbon dioxide in exactly the same way as the less concentrated solutions. In practical operation, the upper limit of concentration of the solution of calcium hydrosulfide is obviously determined by the concentration of the undiluted solution obtained from the sulfidor, and this of course varies, depending upon the concentration of the original lime milk supplied to the sulfidor. However, this concentration of the hydrosulfide solution may be diluted with wash water from the magnesia cake, or with other water as desired. Extreme dilutions are undesirable because of the larger apparatus required.

The concentration of the carbon dioxide gas may be varied from 5% to 100% carbon dioxide as an operative process. The use of dilute gas is not economically desirable because of the large volumes of gas which must be handled. A concentration of 20% to 50% carbon dioxide in an inert gas such as nitrogen is preferred. Gases obtained from the calcination of limestone and containing 20% to 40% carbon dioxide may be advantageously employed. Stack gas or other gas resulting from combustion may also be used.

It should be noted that the hydrogen sulfide is continuously recycled, being evolved in the carbonator and immediately reabsorbed in the sulfidor. The inert gas (nitrogen) introduced into the carbonator with the carbon dioxide, passes therethrough and exits from the carbonator mixed with the evolved hydrogen sulfide, this later mixture then is introduced into the sulfidor and the hydrogen sulfide absorbed, the exit gas from the sulfidor being nitrogen.

It has been mentioned above that the absorption of hydrogen sulfide in a lime milk proceeds as rapidly as the hydrogen sulfide is introduced into the absorber. For this reason, I find it necessary to use only one absorber for the absorption of hydrogen sulfide, although for the purpose of providing continuous operation, I prefer to use two, using one as an absorber while the other is being emptied and refilled.

The absorption of carbon dioxide by calcium hydrosulfide solution is normally not as complete as the absorption of hydrogen sulfide from lime milk. It is obvious, from the preceding description of this process, that if the calcium values in the original lime milk are to be completely extracted, both for the purpose of obtaining complete recovery of the calcium as carbonate and for the purpose of producing a magnesia residue substantially free from calcium oxide, the hydrogen sulfide leaving the carbonators must contain little or no carbon dioxide since carbon dioxide will be absorbed in the lime milk simultaneously with the hydrogen sulfide and will form therein insoluble calcium carbonate which will contaminate the magnesia residue.

As an example, it may be calculated, assuming a dolomitic lime milk made from a lime containing 58% CaO, 39% MgO, and 3% impurities, that if 96.2% of the carbon dioxide is absorbed in the carbonator, the magnesia residue will be contaminated with 5% CaO, while if 99.5% of the carbon dioxide is absorbed in the carbonator, the magnesia residue will be contaminated with 2% CaO.

The carbonator which receives the richest $CO_2$ gas of course reaches complete carbonation before the second carbonator is more than a small fraction of the way toward complete carbonation. The degree of carbonation of the third carbonator at this time is almost negligible, being the square of that fraction. However, these fractions would be cumulative if the first carbonator were refilled and repeated without any other change, and ultimately the second and subsequent carbonators would reach complete carbonation after some multiple cycle of the first.

For this reason I prefer, upon discharging the first completely carbonated carbonator, to introduce the richest $CO_2$ gas into the second carbonator, which then becomes the first of the series. I also prefer to connect the refilled carbonator so as to become the last of the series, so that there is no danger of the last carbonator ever reaching complete carbonation, which would result in carbon dioxide passing along with the hydrogen sulfide going back to the sulfidor.

Figure 2 shows the change in efficiency of absorption of $CO_2$ in calcium hydrosulfide solution with variation in temperature and in rate of gas flow based on a single absorber. For any given gas flow the absorption efficiency increases with increase in temperature, and at any temperature the absorption efficiency decreases with increase in carbon dioxide throughout. To attain high absorption efficiency, together with economical rates of production, I therefore use a plurality of carbonators in series, in which the first carbonator receives the richest $CO_2$ gas, and discharges a gas containing a large amount of hydrogen sulfide and a small amount of carbon dioxide, which gas is in turn passed through the second carbonator which absorbs most of the residual carbon dioxide and discharges a gas still richer in hydrogen sulfide. The gas may be passed through a third and fourth carbonator if desired to further eliminate carbon dioxide. I preferably use at least three carbonators so that no less than two are in series while the third is being emptied and refilled. Furthermore, to avoid using an uneconomic number of carbonators in series, I preferably maintain the liquor in these carbonators at a temperature above 35° C.

As the carbonation proceeds, the calcium hydrosulfide liquor becomes clouded and opaque with the increased content of calcium carbonate. At the end point, the material in the absorber consists of a suspension of calcium carbonate in water. The end point may be determined by any one of several methods, by change in conductivity, in pH, or by lack of hydrogen sulfide in the exit gases from the first carbonator in the series. Furthermore, when a plurality of absorbers is used in series, the exact determination of the end point is not essential, since an overrun only produces small amounts of calcium bicarbonate in the liquor and the economic loss is negligible.

The solid calcium carbonate is separated from the water by filtration. The filter cake is substantially pure calcium carbonate containing no silica, iron, aluminum, or heavy metals, and only traces of magnesia. The water filtrate may be reused in the process if desired.

The process as described above is complete in itself. However, to produce other valuable articles of commerce, I may introduce a subsidiary process which is supplemental to the main process. When the lime milk used in the main process contains appreciable amounts of magnesia, the filter cake from the filtration following the sulfidation process will be composed mainly of magnesium oxide and/or hydroxide together with the impurities from the original lime milk. To obtain from this substantially pure magnesia products, I resuspend a part of this filter cake in water and place the suspension in a gas absorber which I introduce into the gas line between the carbonators and the sulfidor. This auxiliary absorber receives therefore the richest hydrogen sulfide gas.

Figure 1 shows that magnesia will dissolve in the presence of hydrogen sulfide but at a much lesser rate than calcium oxide. The rate, however, is still appreciable. By introducing the auxiliary absorber in the gas line between the sulfidors and the carbonators, I am not concerned with the only partial absorption of hydrogen sulfide which can take place in this absorber since any unabsorbed hydrogen sulfide will immediately be passed on to the sulfidors where it will be absorbed in the main process. Furthermore, I am not concerned with end point control since only the magnesia is now soluble and any overrun simply passes all of the hydrogen sulfide from the carbonators to the sulfidors without any further absorption in the auxiliary absorber.

When the solution of the magnesia is substantially complete, the contents of the absorber may be discharged and filtered. The residue on the filter consists of the impurities in the original lime milk. The filtrate consists of a clear solution of magnesium hydrosulfide which may then be treated in any suitable manner to recover the magnesium values and the sulfide values separately. For example, the solution of magnesium hydrosulfide may be boiled, whereupon the magnesium hydrosulfide decomposes, forming a pure magnesium hydroxide and liberating hydrogen sulfide which may be returned to the main process and introduced into the gas line between the carbonators and the sulfidors.

A schematic flow sheet of the process is shown in Figure 3. The material containing the calcium values if in the form of oxide is introduced in the hydrator 10 where the calcium oxide is converted into calcium hydroxide which is then introduced into the dilutor 11 where it is mixed with additional water to form the lime milk which may be placed in a storage receptacle 12. The lime milk may be transferred from the storage receptacle through either of the two valves 13 into the required sulfidor 14 where it is treated with a gas containing hydrogen sulfide until all of the calcium hydroxide has been dissolved and substantially none of the magnesia has been dissolved. Upon completion of the reaction in the sulfidor 14 the calcium hydrosulfide liquor carrying magnesia and impurities in suspension is withdrawn through valves 15 and passed to a thickener 16. The clear overflow from the thickener 16 is passed directly to the calcium hydrosulfide storage reservoir 19 while the thickener sludge from the thickener is passed to a filter 17 where it may be washed as desired. The clear filtrate is also passed to the calcium hydrosulfide storage reservoir 19 together with any wash water used on the filter, while the filter cake 18, consisting of the magnesia together with all of the insoluble impurities is discharged.

The calcium hydrosulfide liquor is transferred from its storage reservoir 19 to any one of the plurality of carbonators 21 of which four are shown in Figure 3, being introduced into the carbonators through valves 20. While in the carbonators the calcium hydrosulfide liquor is treated with a gas containing carbon dioxide when calcium carbonate is precipitated and hydrogen sulfide is evolved. Upon completion of the carbonation reaction, the contents of the carbonators are discharged through valves 22 to a thickener 23. The overflow from this thickener is water which may be run to waste 26 or may be reused in the process as desired. The thickened calcium carbonate sludge is transferred to a filter 24, the filtrate from this, being water, is also run to waste while the filter cake 25 consisting of a pure calcium carbonate is separately collected for drying and processing as desired.

The gas supply consisting essentially of a mixture of $CO_2$ and $N_2$ enters the system from any suitable source 27 and is introduced into any one of the carbonators through the valves 28. It may leave the carbonator through valve 29 and be transferred directly to the sulfidors, but normally, I prefer to pass the gas through valve 30 to the next carbonator in line and only have valve 29 open on the carbonator which stands last in the series.

The effluent gas leaving the final carbonator through valve 29 consists essentially of a mixture of hydrogen sulfide and nitrogen and is passed through the necessary piping to valves 31 through which it is introduced into whichever sulfidor is being operated. After absorption of the hydrogen sulfide in the sulfidor 14 the effluent gas consisting essentially of nitrogen passes through valve 32 and leaves the process. As the reaction in the sulfidor 14 is nearing completion, I prefer to open valve 33 and close valve 32, thereby passing the effluent gas through two sulfidors in series. This is done to prevent the loss of hydrogen sulfide in the effluent gas which might occur should there be any delay in changing from one absorber to the other upon the attainment of the end point.

Figure 3 also shows diagrammatically one example of an auxiliary process by which I obtain a pure magnesium hydroxide. A portion of the magnesia and impurities 18 is resuspended in water and introduced into the auxiliary absorber 37. By opening valves 35 and 36 and closing or partially closing valve 34 I cause all or part of the gas leaving the carbonators 21 to pass through the auxiliary absorber 37 whereby the magnesia values contained therein are converted into soluble magnesium hydrosulfide while the impurities remain insoluble. After the solution of the magnesia in absorber 37 is completed, the contents thereof are discharged to a filter 38 which removes the impurities as filter cake 39 while the clear filtrate consisting of a solution of magnesium hydrosulfide is subjected to further treatment to separately recover the magnesium and sulfide values. In the example shown, the magnesium hydrosulfide solution is transferred to a boiler 40. Upon application of heat, the magnesium hydrosulfide is decomposed forming insoluble magnesium hydroxide and liberating hydrogen sulfide which is returned to the main process.

The boiled liquor, consisting now of a suspension of magnesium hydroxide in water, is discharged to a filter 41, the magnesium hydroxide being recovered as a filter cake 42 while the filtrate, water, is run to waste 43.

I claim:

1. A process of separating calcium values from magnesium values and other constituents of a material containing mixtures thereof, comprising converting said material into a lime milk, passing a stream of hydrogen sulfide into contact with the lime milk at a rate in excess of the rate of reaction of hydrogen sulfide with magnesium hydroxide and at a rate at which the hydrogen sulfide is completely absorbed in the presence of unreacted calcium hydroxide, discontinuing said stream of hydrogen sulfide as soon as hydrogen sulfide is evident in the effluent gas, at which point at least all but an immaterial amount of the calcium hydroxide has been converted to calcium hydrosulfide and substantially none of the magnesium hydroxide has been converted to magnesium hydrosulfide, and thereafter separating the solution of calcium hydrosulfide from the undissolved constituents.

2. A process of separating calcium values from magnesium values and other constituents of a material containing mixtures thereof, comprising converting said material into a lime milk, passing a stream of hydrogen sulfide into contact with the lime milk at a rate in excess of one half volume of hydrogen sulfide gas at atmospheric temperature and pressure per minute for each volume of lime milk being treated and at a rate in excess of the rate of reaction of hydrogen sulfide with magnesium hydroxide and at a rate at which the hydrogen sulfide is completely absorbed in the presence of unreacted calcium hydroxide, discontinuing said stream of hydrogen sulfide as soon as hydrogen sulfide is evident in the effluent gas, at which point at least all but an immaterial amount of the calcium hydroxide has been converted to calcium hydrosulfide and substantially none of the magnesium hydroxide has been converted to magnesium hydrosulfide, and thereafter separating the solution of calcium hydrosulfide from the undissolved constituents.

3. A process of separating calcium values from other constituents of a material containing mixtures thereof, comprising converting said material into a lime milk, passing a stream of hydrogen sulfide into contact with the lime milk at a rate in excess of the rate of reaction of hydrogen sulfide with magnesium hydroxide and at a rate at which the hydrogen sulfide is completely absorbed in the presence of unreacted calcium hydroxide, discontinuing said stream of hydrogen sulfide as soon as hydrogen sulfide is evident in the effluent gas, at which point at least all but an immaterial amount of the calcium hydroxide has been converted to calcium hydrosulfide and substantially none of the magnesium hydroxide has been converted to magnesium hydrosulfide, thereafter separating the solution of calcium hydrosulfide from the undissolved constituents, passing a stream of carbon dioxide into contact with the calcium hydrosulfide solution to precipitate calcium carbonate and generate hydrogen sulfide, and returning said generated hydrogen sulfide to the prior sulfiding step.

4. A process of separating calcium values from magnesium values and other constituents of a material containing mixtures thereof, comprising converting said material into a lime milk, passing a stream of hydrogen sulfide into contact with the lime milk at a rate in excess of the rate of reaction of hydrogen sulfide with magnesium hydroxide and at a rate at which the hydrogen sulfide is completely absorbed in the presence of unreacted calcium hydroxide, discontinuing said stream of hydrogen sulfide as soon as hydrogen sulfide is evident in the effluent gas, at which point at least all but an immaterial amount of the calcium hydroxide has been converted to calcium hydrosulfide and substantially none of the magnesium hydroxide has been converted to magnesium hydrosulfide, thereafter separating the solution of calcium hydrosulfide from the undissolved constituents, passing a stream of carbon dioxide into contact with the calcium hydrosulfide solution while maintaining said calcium hydrosulfide solution at a temperature above 35° centigrade to precipitate calcium carbonate and generate hydrogen sulfide, and returning said generated hydrogen sulfide to the prior sulfiding step.

JAMES A. MURRAY.